United States Patent
Oluyemi et al.

(10) Patent No.: US 11,937,016 B2
(45) Date of Patent: Mar. 19, 2024

(54) SYSTEM AND METHOD FOR REAL-TIME, EVENT-DRIVEN VIDEO CONFERENCE ANALYTICS

(71) Applicant: International Business Machines Corporation, Armonk, NY (US)

(72) Inventors: Oluwanifemi Oluyemi, Toronto (CA); Vamsee Movva, Cary, NC (US); Chuan Ran, Morrisville, NC (US); A. Jaylani Sharif, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 17/331,154

(22) Filed: May 26, 2021

(65) Prior Publication Data
US 2022/0385858 A1    Dec. 1, 2022

(51) Int. Cl.
| | |
|---|---|
| *H04N 7/15* | (2006.01) |
| *G06F 40/20* | (2020.01) |
| *G06N 20/00* | (2019.01) |
| *G06V 20/40* | (2022.01) |

(52) U.S. Cl.
CPC .......... *H04N 7/155* (2013.01); *G06F 40/20* (2020.01); *G06N 20/00* (2019.01); *G06V 20/46* (2022.01); *G06V 20/49* (2022.01)

(58) Field of Classification Search
CPC ........ H04N 7/155; G06Q 50/01; G06F 9/453; G06F 16/90332; G06F 16/3329; G06F 16/9536; G06F 40/253; G06F 40/35; G06F 40/56; G06F 40/205; G06F 40/242; G06F 40/20; G06N 20/00; G06V 20/20; G06V 20/49; G06V 20/46

USPC ............................................. 348/14.02–14.9
See application file for complete search history.

(56) References Cited

U.S. PATENT DOCUMENTS

| | | | |
|---|---|---|---|
| 8,723,914 B2 | 5/2014 | Mackie et al. | |
| 9,154,730 B2 | 10/2015 | Lee et al. | |
| 2014/0327730 A1 | 11/2014 | Wiener et al. | |
| 2016/0073058 A1 | 3/2016 | Bader-Natal et al. | |
| 2019/0287201 A1 | 9/2019 | Orduna et al. | |
| 2020/0210647 A1 | 7/2020 | Panuganty et al. | |
| 2020/0242151 A1 | 7/2020 | Adlersberg et al. | |
| 2020/0274966 A1 | 8/2020 | Karani | |

(Continued)

FOREIGN PATENT DOCUMENTS

WO       2002047386 A1    6/2002

*Primary Examiner* — Maria El-Zoobi
(74) *Attorney, Agent, or Firm* — Scully, Scott, Murphy & Presser, P.C.

(57) ABSTRACT

A system, platform, computer program product, and/or method to analyze a computer-implemented video conference includes: a plurality of participant devices, and a central processing server. Each participant device is configured to form a video snippet for a time interval of the video conference having audio data and video data; generate a transformed video snippet by embedding extracted participant data and/or metadata into the video snippet; and send each transformed video snippet to the central processing server. The central processing server receives each transformed video snippet; performs analytics on each transformed video snippet; and transmits to at least one of the participant devices, results of the performed analytics. Participant devices can display one or more results of the performed analytics.

25 Claims, 6 Drawing Sheets

(56) References Cited

U.S. PATENT DOCUMENTS

2021/0150769 A1\* 5/2021 Babaheidarian .... G06F 18/2193
2021/0320811 A1\* 10/2021 Constantinides .... G06Q 10/103
2021/0367801 A1\* 11/2021 Rajamani ................ G10L 15/22

\* cited by examiner

SYSTEM AND METHOD FOR REAL-TIME, EVENT-DRIVEN VIDEO CONFERENCE ANALYTICS

BACKGROUND

The present application relates generally to information handling and/or data processing and analytics, and more particularly to video conference analytics that includes in an embodiment providing a dashboard illustrating insights and analytics of various participant data points.

There has been increased demand on the use of video conference tools for virtual meetings to replace actual face-to-face meetings. For example, educational institutions are relying on virtual video conferencing for online classes while corporate entities are relying on video conferencing for virtual meetings. Yet, with the rise in the use of video communication tools for learning and meetings, there is no known method, system, or platform to capture and provide a comprehensive set of real-time data insights that are related to each participant's activity during a video conference, and no known method, system, and/or platform to provide real-time analytics of a video conference that is similar to human perception in a physical face-to-face meeting. Currently, when participants or a conference leader (e.g., teacher) desires any statistics on the virtual meeting or online class they have to manually record, compute, and analyze the related data points, which is labor intensive, time consuming, and cannot be performed in real-time (e.g., while participating in the virtual video conference). In this regard, under the current state of the art, video analytics for video conferencing is only achieved after the meeting is completed by passing video conference recordings through available data analytics software, which is resource intensive and time consuming as the video recording are large files and require large storage capacity.

It would be advantageous to provide a method, system, and/or platform for real time event driven virtual conference analytics wherein a comprehensive set of data is captured and analyzed to understand the various activities that occurred during the virtual video conference. It would be further advantageous if an analytical dashboard could be generated or built illustrating insights on each participant's activity, participation rate, and system and network conditions, which occurred during the live virtual video conference.

SUMMARY

The summary of the disclosure is given to aid understanding of, and not with an intent to limit the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, method, platform, and/or computer program product to achieve different effects. In this regard it will be appreciated that the disclosure presents and describes one or more inventions, and in aspects includes numerous inventions as defined by the claims.

A system, platform, computer program product, and/or method is disclosed according to one or more embodiments for providing real-time, event driven virtual video conference analytics, where in an embodiment a comprehensive set of data is captured and analyzed for understanding the various activities that occurred during the virtual video conference, and in a further embodiment a comprehensive set of data (and metadata) is sent to a participant via a participant device during the video conference, and in an aspect is used to build a dashboard with insights on, for example, one or more of the participants' activity, participation rate(s), and/or system and network conditions during the virtual video conference.

In one or more embodiments a system, platform, computer program product, and/or method of analyzing a computer implemented video conference is disclosed that includes a plurality of participant devices, the method comprising: receiving, by a central processing server having a processor, one or more transformed video snippets sent by at least one of the plurality of participant devices during the video conference, wherein each transformed video snippet comprises audio and video data collected from the at least one of the plurality of participant devices at time intervals in the form of video snippets embedded with at least one of an extracted group consisting of: extracted participant data, extracted participant metadata, and combinations thereof; and performing analytics, by the central processing server, on the one or more transformed video snippets received by the central processing server for a current time interval. According to an approach, a copy of an event handler can be transferred from the central processor to the at least one of the plurality of participant devices. In one or more embodiments, each time interval is a fixed time period, wherein the time period ranges from 2 seconds to 20 seconds, and in an example each time interval is a fixed 10 seconds.

In an embodiment, performing analytics on the one or more transformed video snippets received by the central processing server for a current time interval can include: determining the tone of the audio in the one or more transformed video; analyzing text extracted from the audio in the one or more transformed video snippets; analyzing participant data and/or participant metadata from the one or more transformed video snippets; and/or determining from participant data and/or participant metadata embedded in the one or more transformed video snippets background noise level of a participant device, location of a participant device, whether a participant device collected audio data, whether a participant device shared its display, a participant device condition information, a participant device network latency, whether a participant device had its audio capture device muted, and/or whether a participant device logged onto or off the video conference.

The system, platform, computer program product, and/or method in one or more embodiments includes combining, by the central processing server, the analytics performed on the one or more transformed video snippets received by the central processing server for the current time interval preferably with the performed analytics for all subsequent transformed video snippets received by the central processing server preferably for all prior time intervals. In an aspect, one or more results of the performed analytics are transmitted to one or more participant devices, and in a further aspect one or more results of the combined analytics are transmitted to at least one participant device.

In one or more embodiments a system, platform, computer program product, and/or method for analyzing a computer-implemented video conference is disclosed that includes a plurality of participant devices, each participant device having a processor and the ability to capture audio data and video data. In one or more aspects, the system, platform, computer program product, and/or method includes: forming, by a participant device, a video snippet for a first time interval of the video conference, the video snippet comprising audio data and video data collected during the first time interval from the participant device; extracting, by the participant device, participant data and/or participant metadata from the participant device; generating, by the participant device, a transformed video snippet by embedding into the video snippet, by the participant device, the participant data and/or participant metadata; and sending, by the participant device during the video conference, after the first time interval, the transformed video snippet generated by the participant device to a central processing server. In one or more approaches forming, by the participant device, a transformed video snippet comprises embedding into the video snippet using video stenography. In one or more embodiments, the extracting and/or embedding in the video snippet occurs during the first time interval, and in a preferred embodiment in every time interval. An event handler can be provided, preferably by the central processing server, on each participant device wherein the event handler comprises programming instructions that when executed by the participant device cause the participant device to perform the forming, extracting, generating, and sending steps described above.

In an aspect, in response to the first time interval concluding, the transformed video snippet is immediately sent to the central processor without delay, and in a further aspect the transformed video snippet is sent within a threshold of time after the first time interval concludes. The video conference includes a plurality of time intervals, and the system, platform, computer program product, and/or method further includes sending, by the participant device during the video conference, after each time interval, each transformed video snippet generated by the participant device to the central server. In a further aspect the system, platform, computer program product, and/or method further includes receiving, by the participant device, one or more results of analytics performed on the video conference; and displaying the results of the analytics performed on the video conference on the participant device. Displaying the one or more analytics results on the participant device in an aspect includes displaying the results in a dashboard format on the participant device that includes graphs and text, including a read-out or display of participant audio time.

A system, platform, computer program product, and/or method to analyze a computer-implemented video conference according to an embodiment further includes: a plurality of participant devices, each participant device having a media storage device for storing program instructions and a participant device processor coupled to said media storage device; and a central processing server, the central processing server having a memory storage device storing program instructions and a hardware processor coupled to said memory storage device. Each participant device is configurable to communicate with the central processing server during the computer-implemented video conference; wherein each participant device has an event handler module having collection program instructions stored on said media storage device, the participant device processor, in response to executing the event handler module collection program instructions, is configured to: form and send, by the participant device during the video conference, after the first time interval, and preferably all subsequent time intervals, the transformed video snippets generated by the participant device to a central processing server. The central processing server has a data analytics module having video conference analytics program instructions stored on said memory storage device, the central processing server hardware processor, in response to executing data analytics module video conference analytics program instructions, is configured to: receive, by the central processing server, each transformed video snippet sent by each participant device during the video conference; perform analytics, by the central processing server, on each transformed video snippet received by the central processing server for the first time interval; and transmit to at least one of the participant devices, one or more results of the performed analytics. One or more of the participant devices in response to executing event handler module programing instructions is configured to display the one or more results of the performed analytics.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a computer-implemented system, platform, computer program product, and/or method to provide real time virtual video conference analytics, and in an embodiment an analytic dashboard illustrating various insights regarding the virtual video conference, including insights on participant activity during the video conference, will be better understood when read in conjunction with the figures provided. Embodiments are provided in the figures for the purpose of illustrating aspects, features, and/or various embodiments of the systems, platforms, computer program products, and/or methods, but the claims should not be limited to the precise arrangement, structures, features, aspects, systems, platforms, modules, functional units, circuitry, embodiments, methods, processes, techniques, instructions, programming, and/or devices shown, and the arrangements, structures, features, aspects, systems, platforms, modules, functional units, circuitry, embodiments, methods, processes, techniques, instructions, programming, and devices shown may be used singularly or in combination with other arrangements, structures, systems, modules, platforms, functional units, features, aspects, circuitry, embodiments, methods, techniques, processes, instructions, programming, and/or devices.

DETAILED DESCRIPTION

Figure 1:
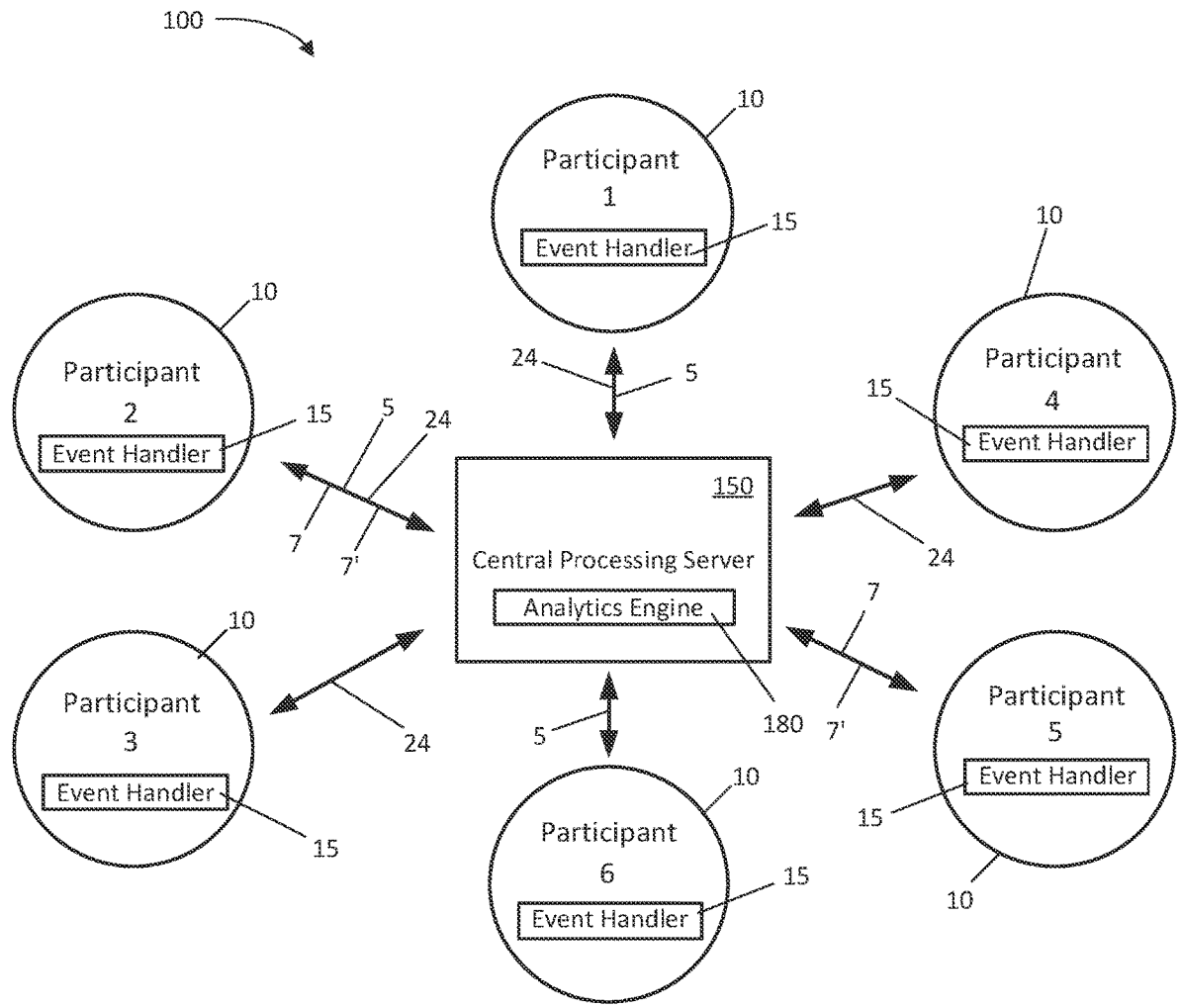
FIG. 1 schematically illustrates a block diagram of an exemplary computer system and/or platform(s) in accordance with the present disclosure to provide real-time virtual video conference analytics, and in an aspect to provide a dashboard that illustrates data analytic insights for example on various participant activities during the virtual video conference.

The following description is made for illustrating the general principles of the invention and is not meant to limit the inventive concepts claimed herein. In the following detailed description, numerous details are set forth in order to provide an understanding of the system, method, and/or techniques for providing data analytics to a virtual video conference, including in an aspect providing a dashboard providing a visual illustration of video conference analytics results. It will be understood, however, by those skilled in the art that different and numerous embodiments of the system, platform, programming instructions and modules, and their method of operation may be practiced without the specific details, and the claims and disclosure should not be limited to the arrangements, structures, systems, modules, functional units, circuitry, embodiments, features, aspects, processes, methods, techniques, instructions, programming, and/or details specifically described and shown herein. Further, particular features, aspects, arrangements, structures, systems, modules, functional units, circuitry, embodiments, methods, processes, techniques, instructions, programming, details, etc. described herein can be used in combination with other described features, aspects, arrangements, structures, systems, modules, functional units, circuitry, embodiments, techniques, methods, processes, instructions, programming, details, etc. in each of the various possible combinations and permutations.

The following discussion omits or only briefly describes conventional features of information processing systems and data networks, including computer-implemented video conferencing platforms. It is assumed that those skilled in the art are familiar with video conferencing facilitated by use of computing systems that interconnect multiple participant devices (for example over the internet) in a virtual meeting that displays images by capturing and recording audio and video data. It is also contemplated that those skilled in the art are familiar with data processing, and the implementation of data analytics, including data analytics systems, platforms, and processes using, for example, machine learning (ML) models, natural language processing (NPL), and data science algorithms (e.g., a tone analyzer to establish tone description of speech).

There has been increased use of video conferencing tools to provide virtual classroom settings or meeting environments. The video conferencing tools however fail to provide real-time analytics that is similar to human perception during a physical face-to-face meeting or a comprehensive set of real time data insights that are related to each participant's activity during a video conference. This disclosure provides a system, platform, computer program product, and/or method that capture several data points to build intelligence to enable participants, including for example an instructor or group leader, to understand the activities that occurred during the virtual video conference, preferably while the video conference is on-going. In one or more embodiments, data is gathered from one or more, and preferably all, the participants, e.g., participant devices, during a virtual video conference and analyzed and processed to provide insights, preferably real-time insights, during and after (e.g., upon conclusion of) the video conference.

In one or more embodiments, metadata is captured and/or created during the video conference on various activities, including the participant's (including for example the instructor's or group leader's) activities, during the video conference to provide real-time analysis, including providing, generating and/or creating a visual dashboard to illustrate the results of the video analytics, including providing and/or generating one or more insights, e.g., insights into each participant's activity during the video conference. In one or more approaches the participant activity is captured by the participant device. In one or more aspects, machine learning, natural language processing (NPL), and data science algorithms can be applied to provide real-time insights into each participant's activity including each participant's personality, sentimental analysis, etc. during the video conference. For example, the disclosed system, platform(s), computer program product(s), and/or method could permit an instructor to get insights such as, for example, participation rate, personality, network condition, etc., on each student to potentially guide the application of different instruction methods for different students, track student's progress and attention to identify trouble spots, etc.

FIG. 1 shows an overview block diagram of system 100, also referred to as platform 100, having multiple participant devices 10 connected to and communicating with a central processing server 150. Each participant device 10 can communicate with central processing server 150 through a public or private network 24 (e.g., the internet). Participant devices 10 according to an embodiment each contain an Event Handler 15, and will be described in greater detail below. The Event Handler 15 has instructions and logic for operating circuitry to capture a participant's activity. For example, the Event Handler 15 can gather and/or capture audio data (participant active speaking, noise level), participant video, time the participant joined and/or left the video conference, time zone, regional weather, network latency, system condition information, etc. The Event Handler 15 in an aspect further provides instructions and logic for operating circuitry to transmit data collected by the participant device to the central processing server 150. One of the participants (e.g., one of the participants devices 10) can be a leader, e.g., the professor or originator of the video conference, and can have different access authorizations, different data (metadata) gathered and transmitted to the central processing server 150, and receive different data (metadata) (e.g., analytic results) from the central processing server 150, as described below.

Central processing server 150 in an embodiment contains an Analytics Engine 180, also referred to as data analytics module 180, that will be described in more detail below. The Analytics Engine 180 has program modules having instructions and logic to operate circuitry to analyze data, including data received from the participant devices 10. The Analytics Engine 180 can contain, for example, machine learning modules, natural language processing modules, sentimental analysis modules, tone analysis modules, as well as other software programming modules. It may be noted that a numbered element is numbered according to the figure in which the element is introduced, and is typically referred to by that number throughout succeeding figures. Analytics Engine (Data Analytics Module) 180 can be a module added to or part of video conferencing platform and/or system, e.g., Zoom, WebEx, etc. Data is transmitted between central processing server 150 and the participant devices 10 through a private or public network 24 (e.g., the internet), which connects the participant devices 10 for the video conference.

Figure 2:
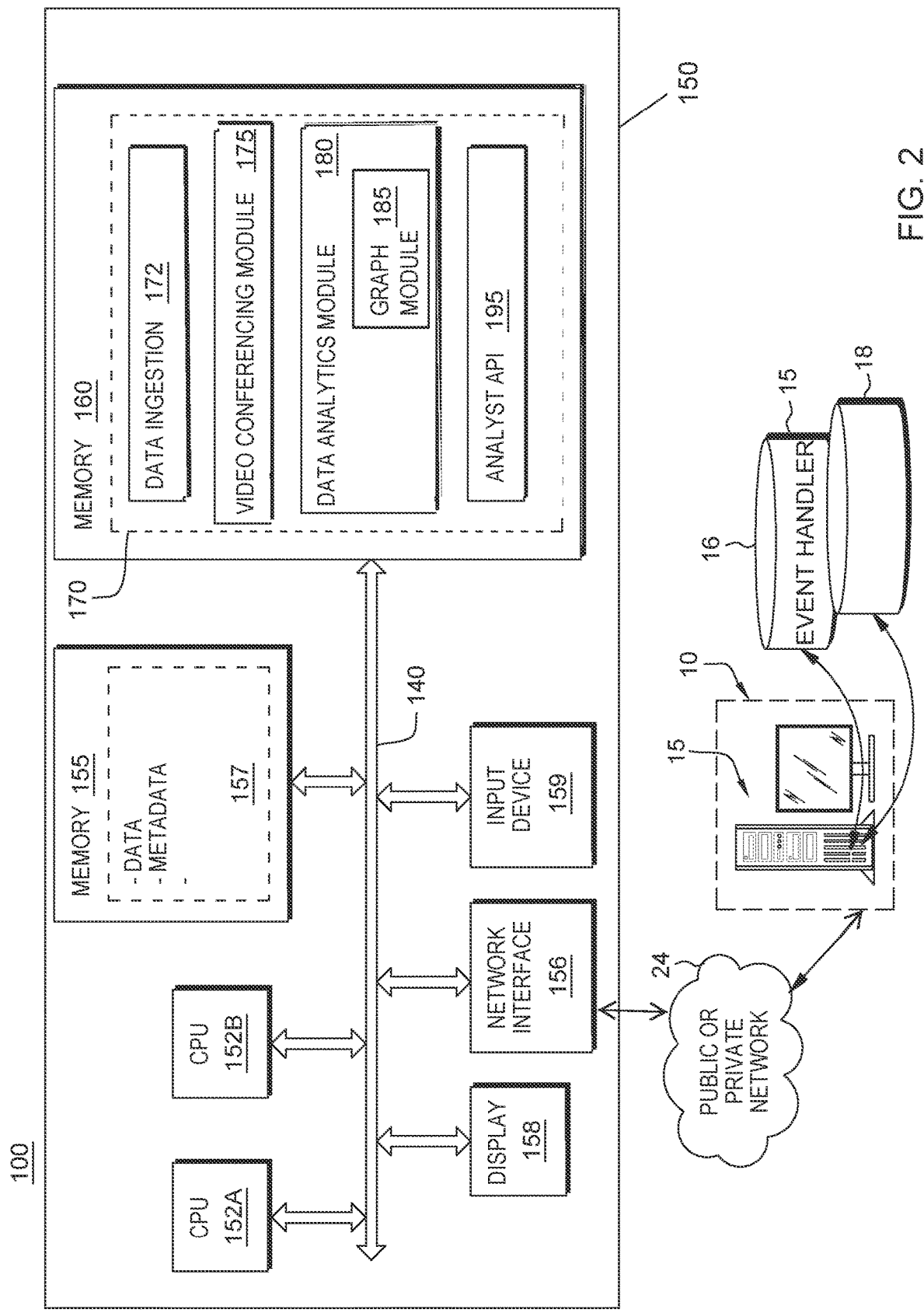
FIG. 2 schematically illustrates a more detailed block diagram of the central processing server of the exemplary computer system and/or platform 100 of FIG. 1, which in accordance with the present disclosure provides real-time virtual video conference analytics, and in an aspect provides a visual dashboard of the video conference analytics.

FIG. 2 illustrates an embodiment of computer system 100 configured and programmed to provide real time virtual conferencing data analytics, and in an aspect is configured and programmed to capture and/or generate metadata, and/or generate and build a visual analytic dashboard with insights, preferably real-time insights, into a video conference, including for example each participant's activity, participation rate, sentiment, personality, tone, and system and network condition. In embodiments, such a system 100 may be employed in a virtual teaching or classroom environment setting by a professor and/or a teacher where students are logged onto participant devices in multiple different locations, e.g., their homes, as well as for virtual meetings with participants logged onto participant devices located in separate and remote locations. According to an embodiment, system 100 can include one or more participant devices 10 in communication with, for example, central processing server 150 through for example a private or public network 24, such as for example the internet.

Central processing server 150 (also referred to as platform 150) includes one or more hardware processors 152A, 152B (also referred to as central processing units (CPUs)), a memory 160, e.g., for storing an operating system, application program interfaces (APIs) and programs, a network interface 156, a display device 158, an input device 159, and any other features common to a central processing system, e.g., a computing device. Further, as shown as part of system 150, there is provided a local memory 155 and/or an attached memory storage device, or a remote memory storage device accessible via a remote network connection for storing data and metadata 157 for input to the system 150. Central processing system 150 in one or more embodiments is configured to communicate with one or more participant computing devices 10, including over a public or private communications network 24.

It is to be understood that the central processing server 150 depicted is only one example of a suitable computing device or system and is not intended to suggest any limitation as to the scope of use or functionality of embodiments of the present invention. For example, the system shown may be operational with numerous other computing system environments or configurations, including special-purpose computing systems. Examples of well-known computing devices or systems, environments, and/or configurations that may be suitable include, but are not limited to, personal computer systems, server computer systems, thin clients, thick clients, handheld or laptop devices, tablets, smart phones, multiprocessor systems, microprocessor-based systems, set top boxes, programmable consumer electronics, network PCs, minicomputer systems, mainframe computer systems, and distributed cloud computing environments that include any of the disclosed systems or devices, and the like.

In some embodiments, the central processing server 150 may be described in the general context of computer system executable instructions, embodied as program modules or software programs stored in memory 160, being executed by the computer system. Generally, program modules may include routines, programs, objects, components, logic, data structures, and so on that perform particular tasks and/or implement particular input data and/or data types in accordance with the present invention.

In the embodiment depicted in FIG. 2, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 150. Processors 152A, 152B are configured to execute instructions, e.g., programming instructions, as described below. These instructions may be stored, for example, as programmed modules in memory storage device 160.

Network interface 156 is configured to transmit and receive data or information to and from a participant device 10, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows central processing server 150 to transmit information to or receive information from the participant device 10.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device. Input device 159 may include, for example, a keyboard, a mouse, a touch-sensitive display, a keypad, a microphone, camera, or other similar input devices or any other input devices that may be used alone or together to provide a user with the capability to interact with the central processing server 150.

Memory 160 may include, for example, non-transitory computer readable media in the form of volatile memory, such as random access memory (RAM) and/or cache memory or others. Memory 160 may include, for example, other removable/non-removable, volatile/non-volatile storage media. By way of non-limiting examples only, memory 160 may include a portable computer diskette, a hard disk, random access memory (RAM), read-only memory (ROM), erasable programmable read-only memory (EPROM or Flash memory), portable compact disc read-only memory (CD-ROM), an optical storage device, a magnetic storage device, or any suitable combination of the foregoing.

Memory 160 of central processing server 150 stores one or more processing modules that include, for example, programming instructions adapted to provide real-time virtual video conferencing, and in one or more embodiments real-time video conferencing analytics, including in an aspect, processing, generating, and/or creating data, metadata, and/or insights that can be used in a visual dashboard readout. In an embodiment, memory 160 includes video processing module 170 which in an aspect includes data ingestion module 172, video conferencing module 175, data analytics module 180, and analyst API 195. Other programs and programming modules stored in memory 160 are contemplated. The data ingestion module 172 has instructions and logic for operating circuitry to receive, access, and/or read large amounts of data, including from outside central processing system 150, e.g., from participant devices 10, and/or from or for use by other modules, e.g., video conferencing module 170, and/or data analytics module 180.

Video Conferencing Module 175 in an embodiment includes instructions and logic to operate circuitry to provide video conferencing capabilities, including receiving, processing, and/or transmitting video and audio data/files, for example with participant devices 10. Video conference module 175 can provide or facilitate sharing computer display screens of participant devices 10 and control over the conference with other participant devices 10.

In an embodiment, Data Analytics Module 180, also referred to as a Data Analytics Engine 180, is included in the system 150, e.g., in video processing module 170 in memory 160. Data Analytics Module 180 contains one or more data analytics modules (e.g., algorithms) and/or software programs that provide instructions and logic for operating circuits to provide advanced data analytics on the metadata retrieved and collected from video snippets during the video conference. The data analytics modules can be used to, for example, analyze the video conference to provide analytics on, for example, participant activity, tone analysis, sentiment analysis, and/or system and network condition information. The data analytics modules and/or programs, in one or more embodiments, leverage cognitive capabilities. A cognitive system (sometimes referred to as deep learning, deep thought, or deep question answering) is a form of artificial intelligence that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art.

Data Analytics Module 180 can invoke a Machine Learning Model to perform supervised (or unsupervised) machine learning techniques to analyze data captured from one or more, and preferably each, of the participant devices 10. Data Analytics Module 180 can also include a natural language processing (NLP) module to analyze the text extracted from the audio collected from each of the participants, via participant devices 10. The NLP module in an embodiment facilitates and/or performs sentiment analysis on the text that is retrieved during the video conference, and in an aspect detects which element of the speech/text is more important during the video conference. Data Analytics Module 180 can also include a tone analyzer to analyze the tone of speech to obtain a sentiment of each participant. Several data analytics modules and programs have been described, however, other data analytics modules are contemplated as included within system 150, e.g., in memory 160, and in an embodiment in the video processing module 170, and more specifically in an aspect in Data Analytics Engine 180.

The Data Analytics Module 180 in an embodiment produces and/or generates a result which can be transmitted to one or more participant devices 10. In one or more embodiments, the Data Analytics Module 180 receives data and metadata from one or more of the participant devices 10, and preferably all the participant devices 10, and/or can receive data and/or metadata ingested by Data Ingestion Module 172 to provide data analysis, and in an embodiment to generate or provide a video conference analytics report including one or more insights. The data analytics report including the one or more insights can be transmitted to the participant devices 10, including in an embodiment to the conference leader device 10. In an aspect, the data analytics report, including, for example, the one or more insights can be transmitted to one or more participant devices in a form providing for a visual dashboard of the video conference analytic results on one or more participant devices 10.

Data Analytics Module 180 in an aspect contains Graphics Module 185 that in an embodiment contains one or more graphics programs that provides instructions and logic for operating circuits to access, read, generate, and/or build one or more graphs, charts and other visual aids to facilitate analysis and generate visual aids to illustrate the analytics. In an embodiment the graphics module 185 can generate or produce a visual dashboard providing the data analytic results, including the one or more insights which can be transmitted to the participant devices 10, including in an embodiment to the conference leader device 10, and according to an aspect to only the conference leader participant device 10, e.g., the professor. While the Graphics Module 185 is shown as being within the Data analytics Module 180, it can be appreciated that the Graphics Module 185 can be a separate module in memory 160, and/or part of another module within memory 160.

Memory 160 optionally includes a supervisory program having instructions for configuring the central processing server 150 to call one or more, and in an embodiment all, of the program modules and invoke the operations of system 150. In an embodiment, such supervisory program calls application program interfaces for running the video processing module 170 including, for example, the Video Conferencing Module 175, Data Analytics Module 180, and/or Graphics Module 185. In one or more embodiments, memory 160, including Video Processing Module 170, Video Conferencing Module 175, and/or Data Analytics Module 180 can include a copy of event handler 15, which can be provided to each participant device 10 over the public and/or private network 24. At least one application program interface (API) 195 is invoked in an embodiment to load Event Handler 15 to a participant device 10. In one or more embodiments, API 195 is invoked in an embodiment to receive input data. Via API 195, in an embodiment data or data files and sets are loaded into Data Analytics Module 180.

Figure 3:
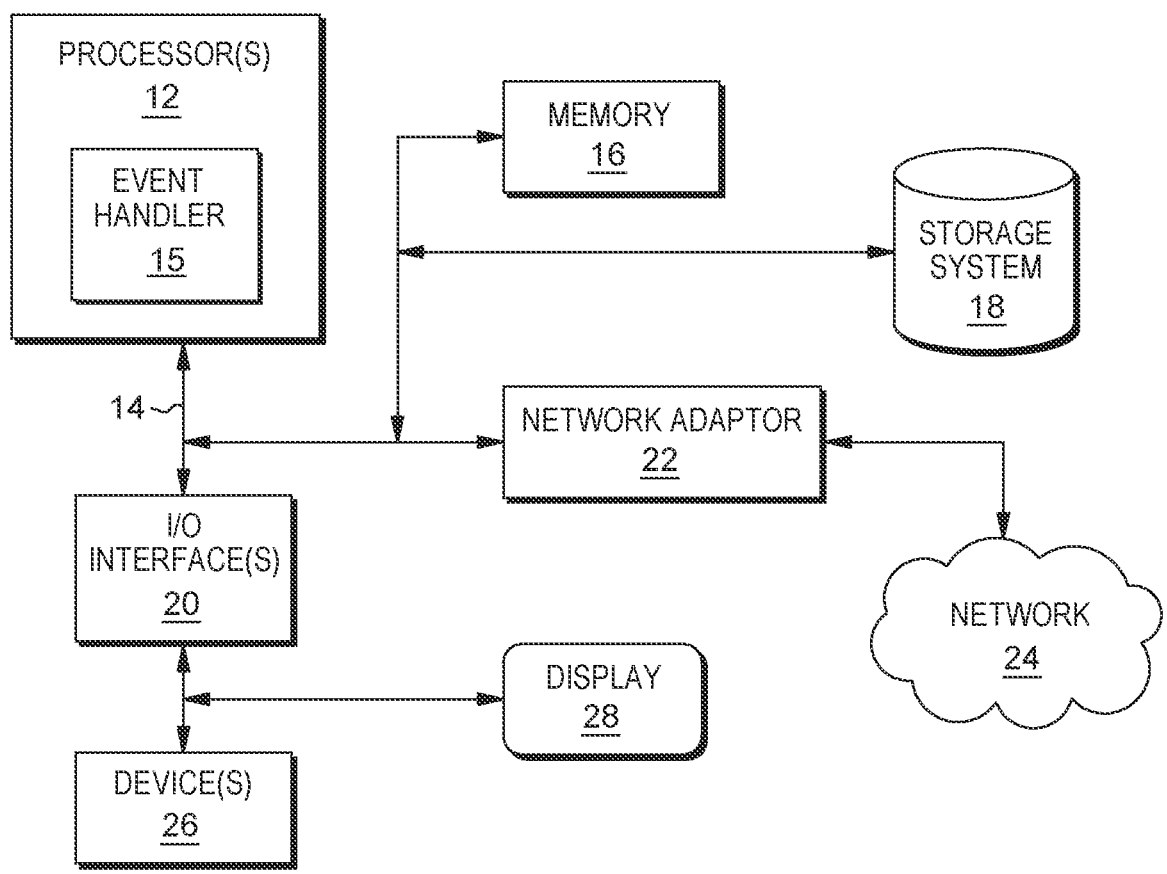
FIG. 3 schematically illustrates a simplified block diagram of the participant device and/or platform 10 of the exemplary computer system and/or platform 100 of FIG. 1, according to an embodiment of the present disclosure.

FIG. 3 illustrates an example participant device 10 (also referred to as a participant platform 10) in accordance with the present invention. It is to be understood that the participant device 10 depicted is only one example of a suitable computing device or system and is not intended to suggest any limitation as to the scope of use or functionality of embodiments of the present invention. For example, the system shown may be operational with numerous other computing system environments or configurations, including special-purpose computing systems. Examples of well-known computing devices or systems, environments, and/or configurations that may be suitable include, but are not limited to, personal computer systems, server computer systems, thin clients, thick clients, handheld or laptop devices, tablets, smart phones, multiprocessor systems, microprocessor-based systems, set top boxes, programmable consumer electronics, network PCs, minicomputer systems, mainframe computer systems, and distributed cloud computing environments that include any of the disclosed systems or devices, and the like.

In some embodiments, the participant device 10 may be described in the general context of computer system executable instructions, embodied as program modules or software programs stored in memory 16, being executed by the computer system. Generally, program modules may include routines, programs, objects, components, logic, data structures, and so on that perform particular tasks and/or implement particular input data and/or data types in accordance with the present invention.

The components of the participant device 10 may include, but are not limited to, one or more processors or processing units 12, a memory 16, and a bus 14 that operably couples various system components, including memory 16 to processor 12. In some embodiments, the processor 12 may execute one or more program modules that are loaded from memory 16, where the program module(s) embody software (program instructions) that cause the processor to perform one or more method embodiments of the present invention. In some embodiments, program module, e.g., software programs, may be programmed into the circuits of the processor 12, loaded from memory 16, storage device 18, network 24 and/or combinations thereof. It is generally appreciated that processor 12 contains circuits including integrated circuits to perform operations of the processor 12. In one or more embodiments, processor 12, memory 16, and/or storage system 18 in participant device 10 includes a software/program module referred to as Event Handler 15. The Event Handler 15 in an embodiment can be loaded from central processing server 150.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The participant device 10 may include a variety of computer system readable media. Such media may be any available media that is accessible by the computer system, and it may include both volatile and non-volatile media, removable and non-removable media. Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The participant device 10 may also communicate with one or more external devices 26 such as a keyboard, a pointing device, a display 28, etc.; one or more devices that enable a user to interact with the participant device; and/or any devices (e.g., network card, modem, etc.) that enable the participant device to communicate with one or more other participant devices. Participant device 10 preferably includes one or more audio capture devices 25, for example a microphone, for capturing audio signals in the location of the participant device. Participant device 10 preferably also includes one or more image capturing devices 27, e.g., cameras, for capturing images, preferably video by for example a video camera. Communication by external devices 26 can occur via Input/Output (I/O) interfaces 20.

Still yet, the participant device 10 can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the participant device. Examples include, but are not limited to: microcode, device drivers, redundant processing units, external disk-drive arrays, RAID systems, tape drives, and data archival storage systems, etc.

In one or more embodiments, Event Handler 15 is downloaded on each participant device 10 and includes instructions and logic for operating circuits to capture participant information via participant device 10. In this regard, each participant device 10 preferably includes a microphone 25 or other device to capture audio during a video conference, and a camera 27, e.g., a video camera, to capture video during a video conference. In one or more embodiments audio and video of the conference is captured by a participant device, preferably audio and video of the participant operating the participant device 10 is captured, and in an aspect is captured in intervals, e.g., in the form of video snippets. The intervals can be intervals of time, number of instructions performed, amount of data collected, or other interval, although the most likely interval will be a time interval. The intervals for each video snippet captured by each participant device 10 can be predefined, predetermined, preset, fixed, adjustable, programmable, and/or machine learned. Each time interval can be fixed in duration, and in an aspect the amount of time for example, can be between 2 to 30 seconds long, for example 10 seconds; or any other time interval. In a preferred embodiment, the interval, e.g., the time interval, for each video segment is the same duration, and taken for the exact same time period. In this manner, each video snippet collected, captured, recorded, and/or stored by each participant device is for the same exact time period during the video conference. Each participant device 10 preferably captures the audio and video of the participant operating that particular participant device 10, including the active speaking of the participant and the noise level.

In addition to audio and video being captured by a participant device 10, further data and/or metadata is captured preferably by each participant device 10. The participant data and/or metadata includes, for example, the time a participant joined and left the conference (e.g., the time a participant device logged onto and left (logged off) the video conference), the length and time of the video conference, a participant's active talking time, video conference interruptions, participant muted microphone time, participant screen sharing time, participant network latency, participant device condition/performance (battery level, CPU, etc.), time zone of the participant device location, and weather conditions in the participant device region. The participant data and/or metadata can be captured during an interval, during the elapsed time of the video conference, or for the entire video conference. Other participant data points and/or participant metadata being captured by a participant device 10 are contemplated.

For each interval, each participant device: collects, captures, records, and/or stores a video snippet; extracts data points and/or metadata from the participant device; and embeds one or more of the extracted participant data points and/or participant metadata into each video snippet, preferably using video stenography, to form transformed video snippets 5. The participant data points and/or participant metadata extracted from the participant device is for the same interval, e.g., the same time interval, corresponding to the audio and video data collected by the participant device for the video snippet. The transformed video snippet includes video, audio, data, and/or metadata collected from the participant device. In addition to the audio and video collected from each participant device, the data and/or metadata included in the transformed video snippet includes as examples, the participant device identifier (participant ID), the video conference ID, participant device condition information, time that participant microphone is muted, and/or time that participant device is logged onto the video conference. Other data and/or metadata being included in the transformed video snippet 5 is contemplated.

Each participant device 10 preferably transmits the transformed video snippet 5 created, generated, recorded, and/or stored by that participant device over the network 24 to the central processing server 150 for processing. The transformed video snippets 5 are preferably sent and/or transmitted to the central processing server 150 immediately after each interval, e.g., time interval, completes and/or concludes. The video conference comprises a plurality of intervals, e.g., time intervals, and each participant device continuously collects video snippets during the plurality of intervals and generates, creates, records, and/or stores transformed video snippets 5. Transformed video snippets 5 preferably are continuously transmitted by each participant device 10 to the central processing server 150, preferably immediately after the completion of each interval, e.g., time interval.

Central processing server 150 receives the transformed video snippets 5, preferably from each participant device 10. The central processing server 150 gathers and/or collects each transformed video snippet 5 for a given interval, e.g., a given time interval, from all participant devices 10 for a given video conference and processes the data and metadata in each transformed video snippet from each device for the given "current" interval. Video conference IDs transmitted with the transformed video snippets and participant device IDs can be used to match transformed video snippets 5 to the proper video conference. The central processing server 150 can perform a variety of data analytics on the transformed video snippets 5 received from the participant devices for the given "current" interval, e.g., the given "current" time interval. The variety and type of analytics performed on the transformed video snippet can be predetermined, preset, predefined, fixed, programable, adjustable, configurable, and/or machine learned.

The central processing server 150 in one or more embodiments transmits the results 7 of the analytics run on the transformed video snippet 5 to one or more, preferably in an embodiment, to all the participant devices 10. The results 7 of the analytics performed on the transformed video snippet 5 in an embodiment can be in the form of an analytics report 432 (see FIG. 4) that in an aspect can include one or more insights 431 into the video conference. The results 7 of the analytics performed on the transformed video snippet can be a report 432 including graphs and text in a form that is displayable on the display 28 of the one or more participant devices 10. In one or more embodiments, the results 7 of the data analytics can be displayable as a dashboard 430 (See FIG. 4) on one or more of the participant devices 10. In an embodiment the results 7 of the data analytics performed by the central processing server 150 are prepared and transmitted to a graphics user interface (GUI) in one or more, preferably in an aspect to all, participant devices 10 which utilize the analytic results 7 transmitted by the central processing server to create dashboard 430. That is, the analytics results 7 for a current interval are sent to one or more participant devices 10 for viewing as report 432 and/or computed insights 431 on a dashboard 430 on the one or more participant devices 10. The analytics report 432 includes insights 431 and/or analytics results 7.

In one or more embodiments, in response to one or more transformed video snippets 5 not received by the central processing server 150 within a set time period after a given interval has concluded/ended, the central processing server 150 can perform analytics on the transformed video snippets received within a set time period to provide results 7 on data (e.g., the transformed video snippets 5) that is available. For example, after a period of time, e.g., 5 seconds, after transformed video snippets were to be received by the central processing server 150, and not all transformed video snippets were received by the central processing server 150, the central processing server 150 can perform the analytics on the transformed video snippets the central processing server 150 did receive so as not to delay the results 7. The results 7 produced can indicate whether full data was received and/or used (e.g., all transformed video snippets 5 for a given interval were processed) to prepare the results 7, and can even indicate in an aspect which participant devices 10 did not contribute to the results 7, e.g., the analytics report. In this manner, where there is network/connectivity or participant device problems, real-time analytics on the video conference can be provided on the data received.

It will be appreciated that the video conference will proceed for a plurality of intervals and that each participant device 10 can continuously generate and transmit transformed video snippets 5 to the central processing server 10. The central processing server 150 can continuously process each of the transformed video snippets 5 received for the plurality of intervals, and can continuously process all the transformed video snippets 5 for each given interval as received, preferably immediately after each given interval concludes to provided real time analysis for each interval, e.g., each time interval in close proximity to the conclusion of that time interval. That is, the central processing server 150 can perform data analytics on all the transformed video snippets received for a given time period (and preferably within a set time period after the time period concludes). The data analytics results 7 for each "current" interval, e.g., last concluded interval, can be combined with the data analytics for the last, previous interval, the last number "n" intervals, and/or preferably all previous intervals. In this manner, the central processing server 150 can perform and/or generate combined analytic results 7', e.g., combined analytics report 7'. The combined analytics report 7' can include in an aspect, one or more insights, text, and/or graphics.

In one or more embodiments, the combined analytics results, e.g., combined analytics report 7', can be transmitted to one or more participant devices 10 for display. In one or more embodiments, the combined analytics results 7' are transmitted to one or more participant devices 10 that can be viewed on a dashboard 430 on a participant device 10. That is, the combined analytics results 7' for all the intervals are sent to one or more participant devices 10 for viewing as report 432 and/or computed insights 431 on a dashboard 430 on the one or more participant devices 10. The analytics report 432 includes insights 431 and/or analytics results 7'.

Figure 4:
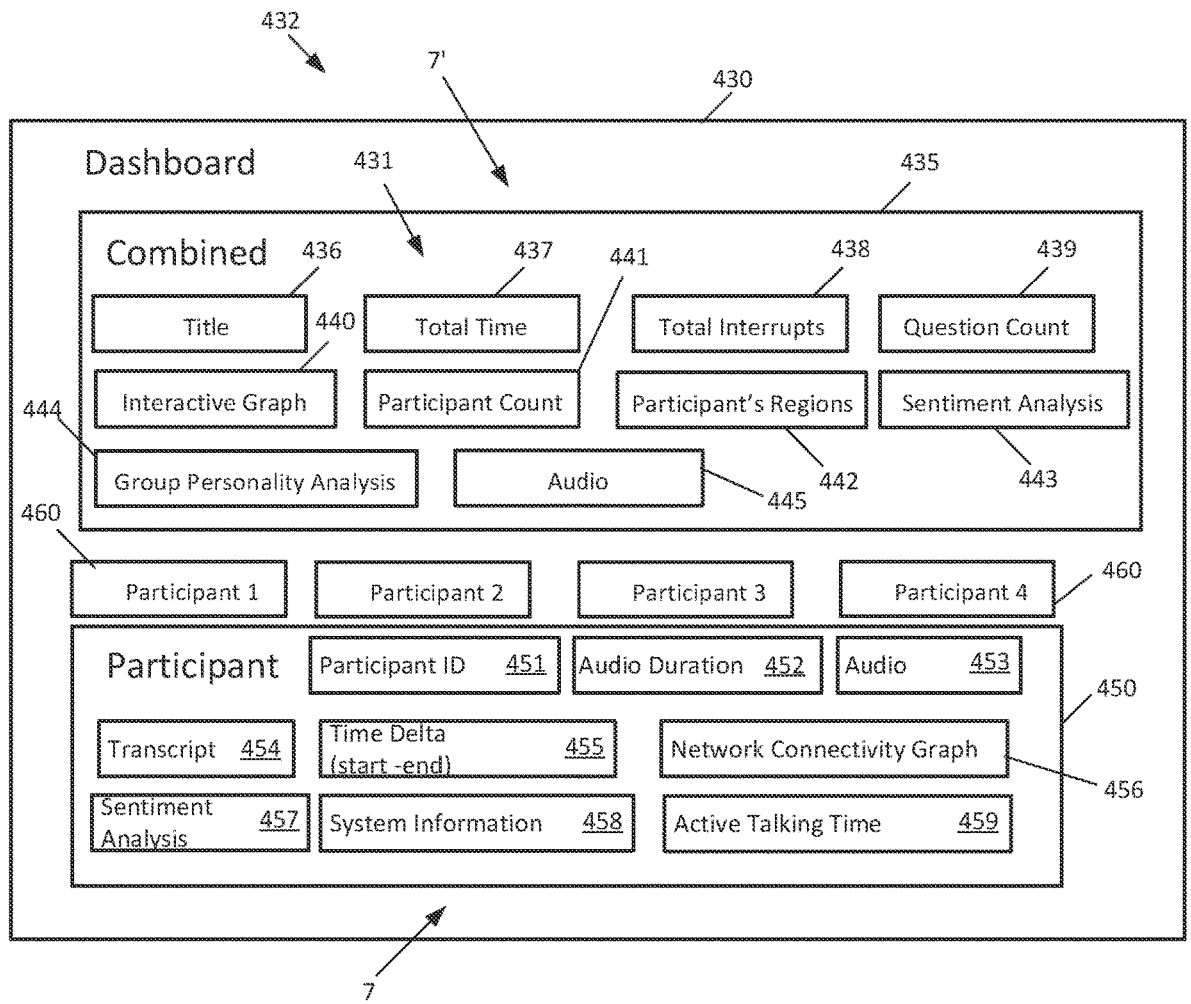
FIG. 4 illustrates a diagram of a real-time video analytics report according to an embodiment of the present disclosure including a visual dashboard visually illustrating the results of the data analytics of the video conference according to an embodiment of the present disclosure.

FIG. 4 is a diagram of a visual dashboard 430 displayed on a display device 28 in a participant device 10 to convey the analytic results (and/or insights) of the analysis of the video conference. The dashboard 430 in an embodiment has a combined data section 435 and a participant data section

450. The combined data section 435 for example can include combined data analytics results 7' and in an embodiment has a title block 436 which provides the title of the video conference or other identifier, for example the conference ID number. Combined data section can also include total time block 437 providing a running or total time of the conference, total interrupts block 438 providing the number of interrupts during the video session, question count block 439 providing a count of the number of questions during the video session, interactive graph block 440 providing a graph of the combined analysis of all participants with respect to their separate data points such as time, interrupts, active, network condition, system information, etc., a participant count block 441 providing the number of participants in the video session, and a participant's regions block 442 identifying and/or counting the number of geographic regions where the participants are located. Sentiment Analysis block 443 displays information on a combined sentiment of all the participants in the video session, while the Group Personality Analysis block 444 displays information on the group personality of all the participants in the video session. The Sentiment Analysis block 443 and the Group Personality block 444 can provide their respective displays based upon the latest "current" time interval (e.g., based upon analytics report 7), or on a combined basis of all the time intervals (e.g., combined analytic results 7'). The Audio block 445 provides the combined audio recording of the conference Participant selector boxes 460 determine which participant information is displayed in participant data section 450 of dashboard 430. Participant ID block 451 provides the participant ID or other identifier of the participant whose information is being displayed. In this regard, when logging into a video session a participant can provide a name or other identifier (student ID number) to identify the participant. In one or more embodiments, the system can obtain an Identifier from the participant device 10. Audio Duration block 452 displays the total duration of time that the participant spoke during the video session, while Audio block 453 provides the audio recording of a particular participant. Transcript block 454 provides a transcript of the participant's audio during the video session, Time Delta block 455 identifies the time that a participant joined and left the video conference, and provides the duration or length of time that the participant has been joined to the video session, and Active Time Talking block 459 provides more detailed information on the amount of time the participant spent talking during the video session, including insights into which time intervals the participant spoke, by for example, spreading out the total timeline of the video conference and identifying the participant's activity during specific times. Network Connectivity Graph Block 456 provides a graph display showing the network connectivity of the participant's device 10 while System Information block 458 provides system condition information regarding the participant's device 10, for example, the battery power level, whether the device is connected to outlet power, the CPU performance, etc. Sentiment analysis block 457 shows the sentiment analysis for that participant. The Sentiment Analysis block 457 can show the sentiment analysis for the last active time interval, for all the time periods, or for some other time interval, e.g., the last ten (10) time intervals.

Figure 5A:
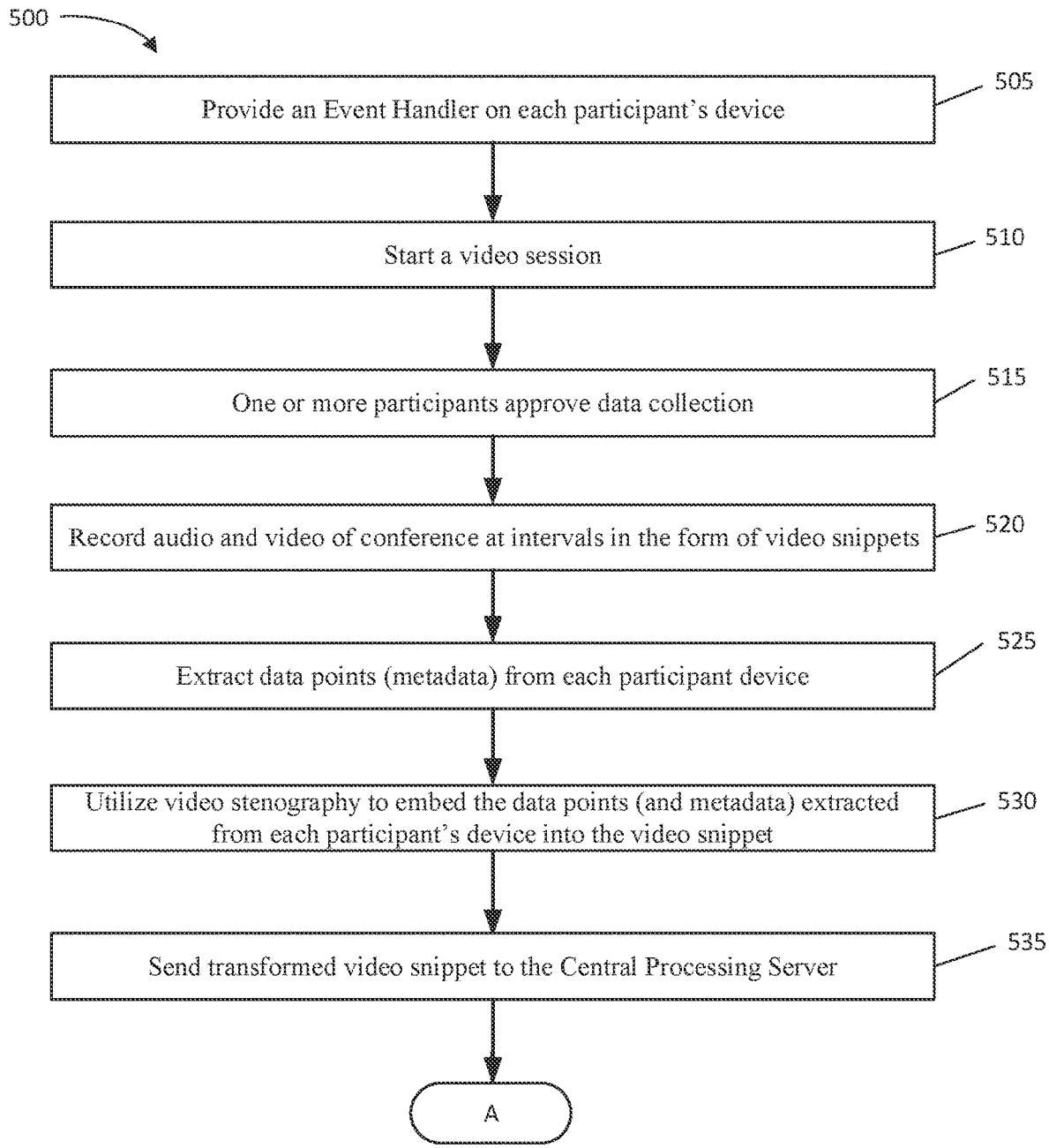
FIGS. 5A & 5B illustrate a diagrammatic flowchart of a method according to an embodiment of the present disclosure of providing real-time video conference analytics where in an aspect FIG. 5A provides the processing performed on a participant computing device and FIG. 5B in an aspect provides the processing performed on a central processing server.
Figure 5B:
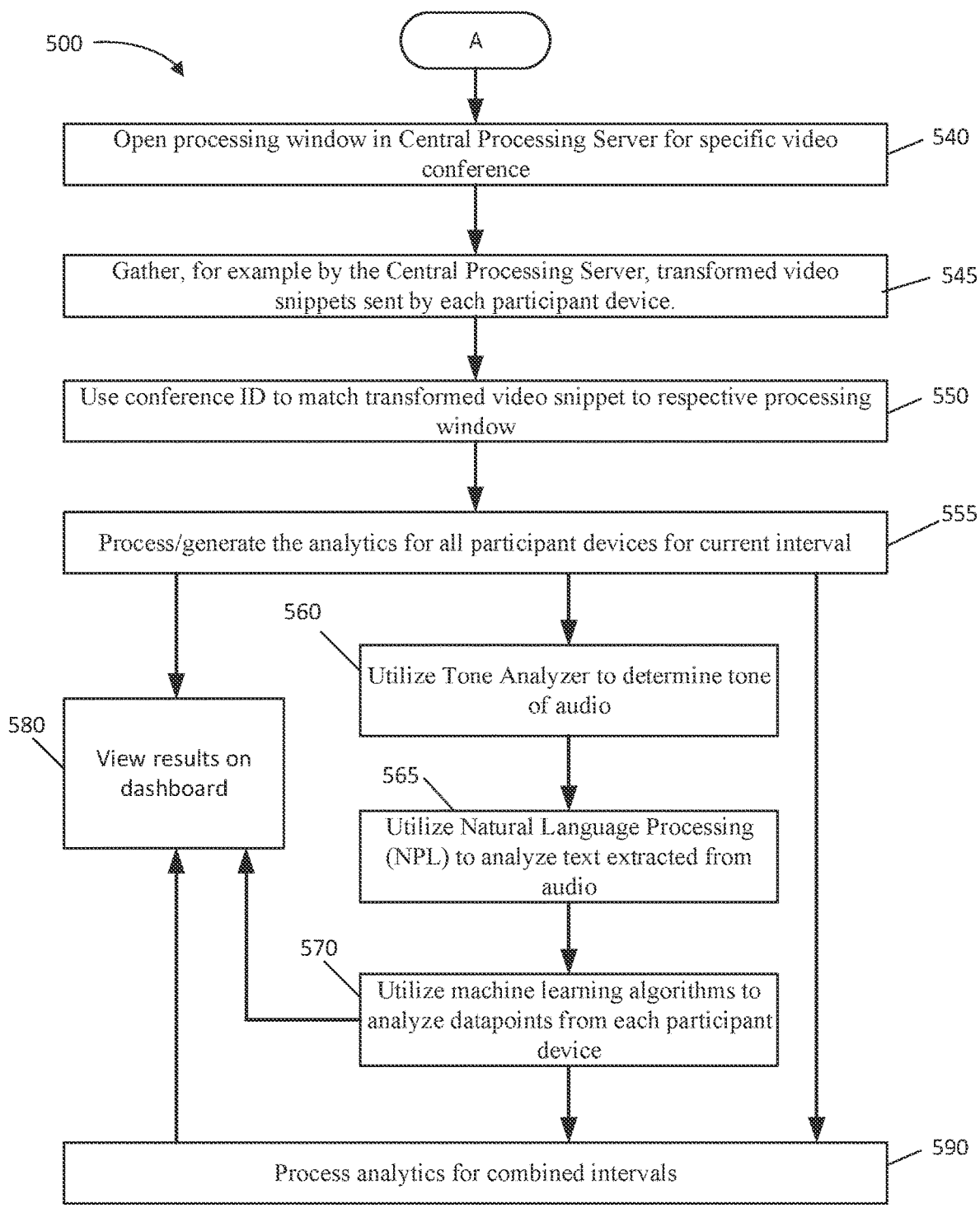

FIGS. 5A & FIG. 5B is an exemplary flowchart in accordance with an embodiment illustrating and describing a method 500 of capturing data and/or metadata regarding a video conference and providing real-time video conference analytics where in an aspect FIG. 5A provides the processing and/or operations performed on a participant device and FIG. 5B in an aspect provides the processing and/or operations performed on the central processing server. In an aspect, method 500 further includes providing a video conference data analytic report that in an aspect includes providing a visual dashboard on one or more participant devices having one or more insights and preferably data on participant activity during the video conference. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5A & FIG. 5B, but the process may be integrated and/or one or more steps may be performed together, simultaneously, or the steps may be performed in the order disclosed or in an alternate order.

In one or more aspects, the method 500 includes at 505 providing an event handler on each participant's device. In an example embodiment Event Handler 15 is loaded onto each participant device 10. In one or more embodiments a copy of Event Handler 15 is obtained from central processing server 150 and loaded into memory of participant device 10. Event Handler 15 can be loaded into storage system 18, memory 16, and/or local memory on processor 12. At 510 a video session, conference and/or meeting is started. In response to starting a video conference, login credentials can be provided from each participant device 10 to central processing server 150, and verified by central processing server 150 to permit each participant device 10 access to and permit participation in the video conference. Each participant device 10 in an embodiment has an identifier, e.g., a unique device ID, or upon login a participant provides for their participant device 10 a user name and/or password to participate in the video conference. Each video conference in an aspect is provided a unique video conference ID. At 515 one or more participants in an aspect approve data collection during the video conference. In this regard, the participants can receive a prompt or otherwise operate a control input as part of the video conference login process.

At 520 in one or more embodiments, audio and video of the video session, conference, and/or meeting is captured, collected, and/or recorded, for example by microphones and/or cameras in the participant device 10. The audio and video that is captured is preferably collected and/or captured in intervals in the form of video snippets. In a preferred embodiment the audio and video are captured together in the video snippets. The interval is typically a time interval, for example 10 seconds of time. The intervals can be for other time periods, and the interval can be preset, predetermined, predefined, fixed, adjustable, programable, configurable, and/or machine learned. For example, factors that can vary or effect the interval are the number of participants (participant devices), participant device performance, and/or network latency. The video conference comprises a plurality of intervals. The video snippets for each interval in one or more embodiments are stored, for example, temporally stored, on the participant device.

In one or more embodiments, a comprehensive set of data points (and/or metadata) can be captured at 520 including audio data and/or metadata that includes active speaking time by the participants, particularly active speaking by the participant via the participant's device 10, and/or background noise level. Active speaking time can be collected by counting/logging the duration that a participant device captures audio by its microphone 25, including logging the time that the participant starts talking and ends talking and calculating the elapsed time, and adding the elapsed time(s)

over the interval of the video snippet. The comprehensive set of data points (and/or metadata) collected at 520 can further include: the time of the video session, conference and/or meeting; the time that the participant joined or left the session, conference and/or meeting; when (time that) the participant microphone was muted; screen sharing time of the participant; the time zone of the participant device; the regional weather where the participant device is located; the network latency; and system condition information, including participant device condition information and performance such as battery information, whether the participant device is plugged in, power consumption, CPU usage, etc. It is contemplated that other data and/or metadata will be collected, captured, and/or recorded by the participant device 10. In one or more embodiments, the data and/or metadata collected by the participant device 10, for example over the current interval, can be stored in memory on the participant device 10.

At 525, participant data points and/or participant metadata are extracted from each participant device. The data points and/or metadata can include one or more of the data points and/or metadata described in connection with 520. The data points and/or metadata extracted at 525 from each participant device 10 is for the interval, e.g., the time interval, corresponding to the interval, e.g., time interval, for the video snippet. At 530, one or more of the extracted participant data points and/or participant metadata from a participant device are embedded by the participant device into the video snippet captured and/or generated by that participant device to form a transformed video snippet. In an embodiment, video stenography is used to embed the participant data points and/or participant metadata extracted from each participant device into the video snippet to form the transformed video snippet, which includes the audio and video captured by the participant device. For example, the text from the speech in the audio is embedded into the video snippets using video stenography. A transformed video snippet is produced/generated, and/or created by each participant device in an embodiment for each interval, e.g., each time interval. More preferably, a transformed video snippet is produced, generated, and/or produced by one or more, preferably each, participant device(s) immediately following each interval. In an aspect, upon conclusion of the interval, which is preferably the same for each participant device, each participant device produces or generates a transformed video snippet. The transformed video snippet in one or more embodiments includes a conference identifier, for example a conference identification (ID) number.

The transformed video snippet, e.g., the audio and video snippet with the embedded data points and/or metadata (and in an aspect the conference ID), is sent at 535 to the central processing server 150 by each participant device 10. That is, in one or more embodiments, one or more, preferably each, participant device sends and/or transmits each transformed video snippet for each interval to the central processing server 150. In a preferred embodiment, each transformed video snippet is transmitted immediately following the conclusion of the interval and the creation of the transformed video snippet to the central processing server 150. That is, in response to and/or upon completing the creation, production, and/or generation of the transformed video snippet for a given interval by a participant device, the transformed video snippet for the given interval is sent to the central processing server 150. By keeping any delay in creating and transmitting the transformed video snippet for an interval to a minimum, facilitates real-time analysis of the video conference. It can be appreciated that in one or more embodiments the actions taken at 505, 510, 515, 520, 525, 530, and 535 are handled by one or more, preferably each and every, participant device 10.

At 540, a processing window in the central processing server 150 is opened for each specific video conference, which in an aspect includes a video conference identifier (ID). At 545 transformed video snippets from one or more, preferably each and every, participant device 10 are gathered and/or collected, for example, at the central processing server 150. In an example embodiment, each video snippet sent from each participant device 10 for each time interval is received and gathered at 545 by the central processing server 150. According to an implementation, each conference ID and time interval received from each participant device 10 is used at 550 by the central processing server 150 to match video snippets to a respective processing window.

At 555 analytics for all participants for a current (same) time interval are processed and used to generate analytics, e.g., analytics report 432 and/or insights 431, for the video conference. For example, analytics is performed for each interval on each transformed video snippet for a video conference (e.g., each transformed video snippet having the same video conference ID) received by the central processing server 150. In an example embodiment, each transformed video snippet for a given interval, e.g., the current interval, of a video conference is performed by the central processing server 150. It can be appreciated that for each interval of a video conference, analytics can be performed for each individual transformed video snippet to obtain individual analytic results (e.g., analytic report and/or insights) for each participant, and/or analytics can be performed on the group of transformed video snippets to obtain combined insights and/or analytic results on the group of participants, e.g., combination and/or summation of the results of each of the transformed video snippets analyzed together as a group.

It can be appreciated that the type and amount of analytics performed on each transformed video snippet can be varied, and would be a matter of design choice. For example, a tone analyzer (in memory 160 of central processing server 150) is used in an embodiment at 560 to determine the tone of the audio portion from one or more, preferably each, transformed video snippet from each participant device (e.g., for each participant) for the "current" interval. In a further example, at 565 a natural language processing (NPL) module is used to analyze the text extracted from the audio in each transformed video snippet for the "current" interval. At 570 a machine learning algorithm is used to analyze datapoints and/or metadata extracted from the current interval of each transformed video snippet received from one or more, preferably each, participant device. The results for the analysis of the transformed video snippet for the current interval from the different data analytics modules in Data Analytics Module 180 can be aggregated to provide a video conference analytics report for the current interval that in one or more embodiments includes one or more insights, particularly one or more insights on a participant's activity during the video conference for the current interval. In one or more embodiments, the resulting analytics performed on the transformed video snippets can provide insights into one or more, or all, of the participant's personality, sentiment, activity level, participation rate, noise level, network condition, and/or system condition during the current interval. After 555 and/or 570, the data analytics results with the computed insights for the current interval are sent to one or more, preferably each, of the participant devices, and in an embodiment is sent to a graphics user interface (GUI)

accessible to each user of a participant to view the results. That is, in an embodiment the insights 431 and/or analytics report for the current interval is sent after 555 and/or 570 for viewing on a display as a dashboard, e.g., dashboard 430, at 580, on one or more, preferably each, participant device 10. It can be appreciated that the dashboard and the analytic results accessible to a participant device can be controlled, and/or adjustable, for example by permission levels and the authority of users of participant devices (e.g., by the video conference leader).

After 555, and/or 570, the analytics with the computed insights 431 for the current interval are sent to one or more of the participants devices, and in an embodiment is sent to a graphics user interface (GUI) accessible to each user to view the results. That is, in an embodiment the insights 431 and/or analytics report 432 for the current interval is sent after 555 and/or 570 for viewing at 580 on a dashboard 430 on a participant device.

In addition, after 555 and/or 570 the analytics of the video conference for the current interval can be combined with some of (for example, ten), or all, the prior intervals at 590. In one or more embodiments, at 590 the analytics from the current time interval determined at 555 and/or 570 can be added and/or combined with the previously calculated analytics at 590 for some of, and/or all, the previous time intervals to create analytic results for recent and/or all the previous time intervals. For example, after first data analytics are performed and/or computed for first transformed video snippets from one or more participant devices for a first interval, second data analytics are performed and/or computed for second transformed video snippets from the one or more participant devices for a second interval, and the results from the first data analytics are combined with the results from the second data analytics to provide a combined data analytics. After the second data analytics are performed and/or computed for second transformed video snippets from one or more participant devices for the second time interval, third data analytics are performed and/or computed for third transformed video snippets from one or more participant devices for the third interval, and the results from the third data analytics are combined with the results from the combined first and second data analytics to form combined analytic results. This process can continue for some or for all the intervals of the video conference that have transpired to provided combined data analytics. In this manner, on-going, real-time combined data analytics can be performed for the video conference, with the analytic results being continuously updated. In an aspect, each insight and/or each data point and/or parameter of the video conference that is analyzed can be updated as the video conference progresses. For example, the results from the different data analytics modules in data analytics module 180, e.g., analysis of all the data points, parameters, and/or insights, from the current time interval can be aggregated with the results from the different data analytics modules in data analytics module 180 from the prior intervals to provide a video conference analytics report for all the time intervals that in one or more embodiments includes one or more insights, particularly one or more insights on a participant's activity during the video conference up to that point in time.

In a further embodiment, at 590, data analytics can be performed on some and/or all the transformed video snippets from all the participant devices for all the intervals that have transpired. For example, tone analyzer (in memory 160 of central processing server 150) is used in an embodiment at 590 to determine the tone of the audio for each participant transformed video snippet over some of and/or all the intervals. In a further example, at 590 a natural language processing (NPL) module is used to analyze the text extracted from the audio in each participant transformed video snippet over some or all the intervals, e.g., some or all the time periods. At 590 a machine learning algorithm is used to analyze datapoints and/or metadata from each participant transformed video snippet for some and/or all intervals. The results of the analysis of some and/or all the time intervals from the different data analytics modules in data analytics module 180 can be aggregated to provide a video conference analytics report for some and/or all the time intervals that in one or more embodiments includes one or more insights, particularly one or more insights on a participant's activity during the video conference up to that point in time. In one or more embodiments, the analytics can provide insights into one or more, or all of the participant's personality, sentiment, activity level, participation rate, noise level, network condition, and/or system condition for some and/or all the time intervals.

In addition, or alternatively, in an embodiment, after 590, the results (e.g., the analytics and computed insights for all the time intervals) from the different data analytics modules in the data analytic module 180 are sent to one or more participant devices (e.g., to the GUI) for review at 580 on a dashboard 430 on a participant's device 10. The analytic results sent at 590 in an embodiments are from some and/or all the previous intervals, including an aggregated analytic report and/or insights, including the various data points, insights, and parameters shown in dashboard 430. It should be appreciated that different insights and information can be sent back to different participant devices. For example, a group leader or instructor might have permissions to receive all data and analytics, whereas other participants might have permission to receive only a subset of all the data and analytics generated and produced by system/platform 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implement method of analyzing a computer implemented video conference that includes a plurality of participant devices, the method comprising:
   receiving, by a central processing server having a processor, one or more transformed video snippets sent by at least one of the plurality of participant devices during the video conference, wherein the one or more transformed video snippets comprise audio and video data collected from the at least one of the plurality of participant devices at time intervals in the form of video snippets embedded with at least one of an extracted group consisting of: extracted participant data, extracted participant metadata, and combinations thereof;
   using, by the central processing server, a video conference identifier embedded in the one or more transformed video snippets to match the one or more transformed video snippets, sent by the at least one of the plurality of participant devices to the central processing server, to a specific video conference; and
   performing analytics, by the central processing server, on the one or more transformed video snippets received by the central processing server for a current time interval.

2. The computer-implemented method recited in claim 1, further comprising:
   transferring, from the central processor to the at least one of the plurality of participant devices, a copy of an event handler, wherein the copy of the event handler comprises programming instructions, which when executed by the at least one of the plurality of participant devices, configures the at least one of the plurality of participant devices to:
      form, by the at least one of the plurality of participant devices, a plurality of video snippets at time intervals during the video conference, each of the plurality of video snippets comprising audio and video data collected during a time interval of the video conference from the at least one of the plurality of participant devices;
      extract from the at least one of the plurality of participant devices during the video conference one of an extracted group consisting of: participant data; participant metadata; and combinations thereof;
      generate a transformed video snippet by the at least one of the plurality of participant devices at time intervals, by embedding into a video snippet using video stenography the at least one of the extracted group; and
      send by the at least one of the plurality of participant devices during the video conference, after each time interval, the transformed video snippet formed by the at least one of the plurality of participant devices to the central processing server.

3. The computer implemented method recited in claim 1, wherein performing analytics on the one or more transformed video snippets received by the central processing server for a current time interval comprises at least one of the group consisting of:
   using a tone analyzer to determine the tone of the audio in one or more transformed video snippets received by the central processing server for the current time interval;
   using natural language processing to analyze text extracted from the audio in the one or more transformed video snippets received by the central processing server for the current time interval;
   using machine learning algorithms to analyze at least one of the group consisting of the participant data, the participant metadata, and combinations thereof from the one or more transformed video snippets received by the central processing server for the current time interval;
   using at least one of the group consisting of the participant data, the participant metadata, and combinations thereof embedded in the one or more transformed video snippets received by the central processing server for the current time period to determine at least one of the group consisting of: background noise level of each participant device; location of each participant device; whether a participant device collected audio data; whether a participant device shared its display; each participant device condition information; each participant device network latency; whether a participant device had its audio capture device muted; whether a participant device logged onto or off the video conference, and combinations thereof; and
   combinations thereof.

4. The computer-implemented method recited in claim 1, further comprising transmitting one or more results of the performed analytics to one or more participant devices participating in the video conference.

5. The computer-implemented method recited in claim 1, further comprising:
   combining, by the central processing server, the analytics performed on the one or more transformed video snippets received by the central processing server for the current time interval with the performed analytics for all subsequent transformed video snippets received by the central processing server for all prior time intervals.

6. The computer-implemented method recited in claim 5, further comprising transmitting one or more results of the combined analytics to any one of the plurality of participant devices.

7. The computer-implemented method recited in claim 1, wherein the time intervals are at least one of the group consisting of: fixed, predetermined, preset, adjustable, configurable, programable, machine learned, and combinations thereof.

8. The computer-implemented method recited in claim 7, wherein each time interval is a fixed time period, wherein the time period ranges from 2 seconds to 20 seconds.

9. A computer-implemented method for analyzing a computer-implemented video conference including a plurality of participant devices, each participant device having a processor and the ability to capture audio data and video data, the method comprising:
    forming, by a participant device, a video snippet for a first time interval of the video conference, the video snippet comprising audio data and video data collected during the first time interval from the participant device;
    extracting, by the participant device, at least one of an extracted group consisting of: participant data, participant metadata, and combinations thereof from the participant device;
    generating, by the participant device, a transformed video snippet by embedding into the video snippet, by the participant device, the at least one of the extracted group;
    approving collection and use of, during the video conference by the participant device, the at least one of the extracted group; and
    sending, by the participant device during the video conference, after the first time interval, the transformed video snippet generated by the participant device to a central processing server.

10. The computer-implemented method according to claim 9, wherein forming, by the participant device, a transformed video snippet comprises embedding into the video snippet using video stenography the at least one of the extracted group.

11. The computer-implemented method according to claim 9, wherein the first time interval is at least one of the group consisting of fixed, predetermined, preset, adjustable, configurable, programable, machine learned, and combinations thereof.

12. The computer-implemented method according to claim 9, further comprising providing an event handler on each participant device wherein the event handler comprises programming instructions that when executed by the participant device cause the participant device to perform the forming, extracting, generating, and sending steps of claim 9.

13. The computer-implemented method according to claim 9, wherein the at least one of the extracted group during the first time interval consists of at least one of the following: times that the participant device joined and left the video conference; background noise level at the participant device; times that the participant device recorded audio; times that an audio capture device of the participant device was muted; times that the participant device shared its screen during the video conference; the participant device network latency information, the participant device condition information; time zone of the participant device; location of the participant device; identity information of the participant device; and combinations thereof.

14. The computer-implemented method according to claim 9, further comprising, in response to the first time interval concluding, immediately sending the transformed video snippet to the central processor without delay.

15. The computer-implemented method according to claim 9, further comprising sending the transformed video snippet to the central processor within a threshold of time after the first time interval concludes.

16. The computer-implemented method according to claim 9, wherein the video conference comprises a plurality of time intervals, the method further comprising sending, by the participant device during the video conference, after each time interval, each transformed video snippet generated by the participant device to the central server.

17. The computer-implemented method according to claim 16, wherein each time interval is a fixed 10 seconds.

18. The computer-implemented method according to claim 9, further comprising:
    embedding into the video snippet, by the participant device, a conference identifier to identify a specific video conference when generating the transformed video snippet; and
    sending, by the participant device, the transformed video snippet having the embedded conference identifier.

19. The computer-implemented method according to claim 9, further comprising:
    receiving, by the participant device, one or more results of analytics performed on the video conference; and
    displaying the results of the analytics performed on the video conference on the participant device.

20. The computer-implemented method according to claim 19, wherein displaying the one or more analytics results on the participant device comprises displaying the results in a dashboard format on the participant device that includes graphs and text, including a read-out or display of participant audio time.

21. The computer-implemented method according to claim 19, further comprising:
    determining the one or more analytics results to display on the participant device, wherein determining the analytics results to display on the participant device comprises checking the permissions of the participant device.

22. A computer-implemented method for analyzing a computer-implemented video conference including a plurality of participant devices, each participant device having a processor and the ability to capture audio data and video data, the method comprising:
    forming, by a participant device, a video snippet for a first time interval of the video conference, the video snippet comprising audio data and video data collected during the first time interval from the participant device;
    extracting, by the participant device, at least one of an extracted group consisting of: participant data, participant metadata, and combinations thereof from the participant device;
    generating, by the participant device, a transformed video snippet by embedding into the video snippet, by the participant device, that at least one of the extracted group; and
    sending, by the participant device during the video conference, after the first time interval, the transformed video snippet generated by the participant device to a central processing server;
    receiving, by the participant device, one or more results of analytics performed on the video conference;
    determining the one or more analytics results to display on the participant device, wherein determining the analytics results to display on the participant device comprises checking the permissions of the participant device; and
    displaying the results of the analytics performed on the video conference on the participant device.

23. The computer-implemented method according to claim 22, wherein displaying the one or more analytics results on the participant device comprises the results in a dashboard format on the participant device that includes graphs and text, including a read-out or display of participant audio time.

24. The computer-implemented method according to claim 22, further comprising:
   embedding into the video snippet, by the participant device, a conference identifier to identify a specific video conference when generating the transformed video snippet; and
   sending, by the participant device, the transformed video snippet having the embedded conference identifier.

25. The computer-implemented method according to claim 9, wherein the at least one of the extracted group during the first time interval consists of at least one of the following: times that the participant device joined and left the video conference; background noise level at the participant device; times that the participant device recorded audio; times that an audio capture device of the participant device was muted; times that the participant device shared its screen during video conference; the participant device network latency information, the participant device condition information; time zone of the participant device; location of the participant device; identity information of the participant device; and combinations thereof.

\* \* \* \* \*